June 26, 1956
L. C. BEARER
2,752,231
MEANS FOR CONVERTING HYDROCARBONS
Filed July 20, 1951
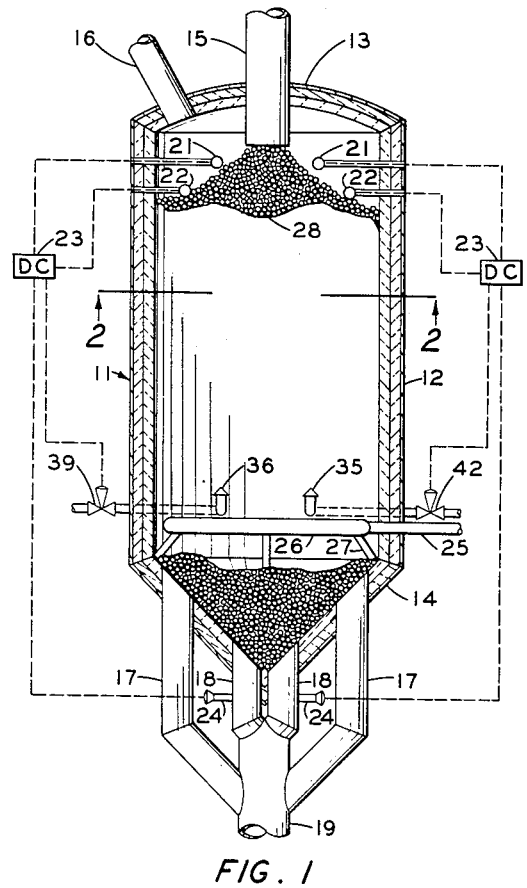
FIG. 1
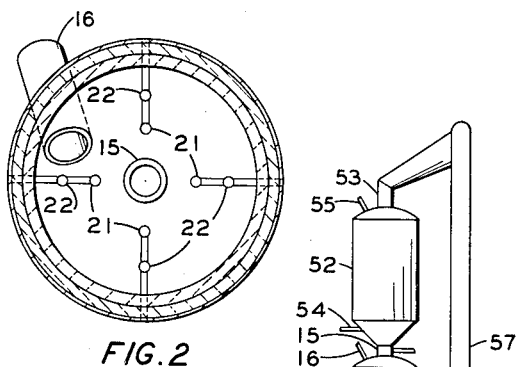
FIG. 2
FIG. 5
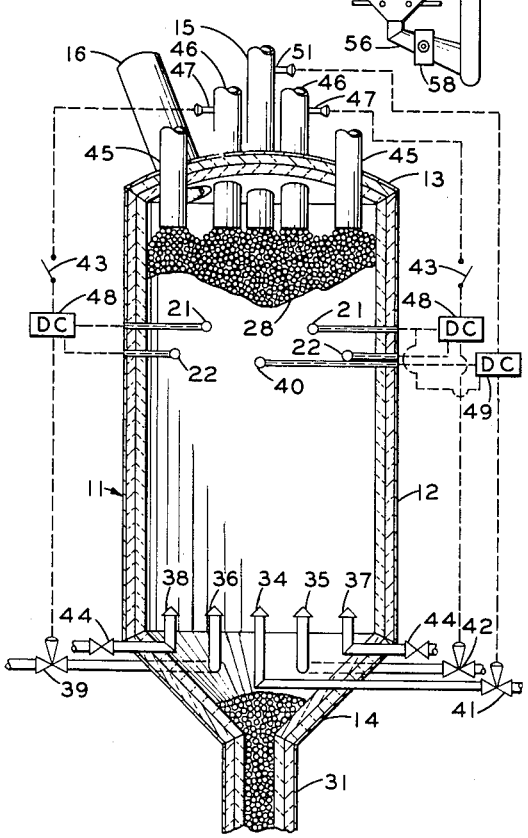
FIG. 4
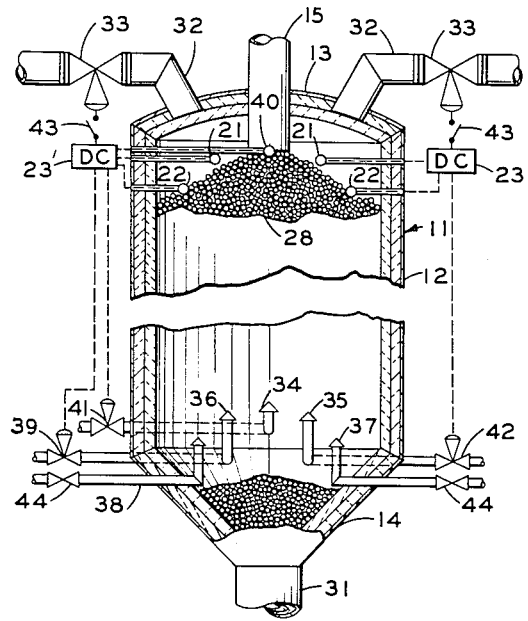
FIG. 3
INVENTOR.
L.C. BEARER
BY Hudson and Young
ATTORNEYS

United States Patent Office 2,752,231
Patented June 26, 1956

2,752,231

MEANS FOR CONVERTING HYDROCARBONS

Louis C. Bearer, Bartlesville, Okla., assignor to Phillips Petroleum Company, a corporation of Delaware Application July 20, 1951, Serial No. 237,714

14 Claims. (Cl. 23—284)

This invention relates to the conversion of hydrocarbons. In one of its more specific aspects, it relates to the conversion of hydrocarbons in pebble heater apparatus. In another of its more specific aspects it relates to improved pebble heater apparatus for the conversion of hydrocarbons. In another of its more specific aspects it relates to a means and method for distributing reactant material throughout a pebble conversion chamber in response to at least one gas variable therein.

Thermal conversion processes which are carried out in so-called pebble heater apparatus utilize a flowing mass of solid heat exchange material, which mass is heated to a high temperature by passing hot gas therethrough in a first direct heat exchange step and is then caused to contact gaseous reactant materials, furnishing heat thereto in a second direct heat exchange. The conventional pebble heater apparatus generally comprises two chambers which may be disposed in substantially vertical alignment. The solid heat exchange material is introduced into the upper portion of the first chamber. That material forms a gravitating bed which flows downwardly through the chamber in direct heat exchange with hot gaseous exchange material. The solid heat exchange material is heated to a high temperature during the heat exchange and is then gravitated to a second chamber in which the hot solid heat exchange material is caused to contact gaseous reactant materials in a second direct heat exchange relation furnishing heat for the treatment or conversion of the gaseous materials.

Conventional pebble heater chambers of pebble heater apparatus are generally formed as cylinders in which a solid heat exchange material is collected in the form of a moving bed. Hot heat exchange gases are sometimes introduced into the cylindrical bed at the periphery of its lower end portion and are sometimes introduced through a refractory arch which supports the moving pebble bed. The solid heat exchange material is usually drawn from substantially a central point in the bottom of the bed and is passed downwardly into a gas heating chamber where a second moving bed of solid heat exchange material is formed.

One disadvantage in the operation of conventional pebble reaction chambers is that it is most difficult to establish uniform flow of reactant materials in contact with uniformly heated pebbles from the pebble heater chamber. In the withdrawal of solid heat exchange material from a substantially central point in the bottom of a pebble reaction chamber, the moving solid heat exchange material tends to form an inverted cone. That material which is below and outside of the cone remains in what is substantially a stagnant area. At the same time, when solid heat exchange material is introduced centrally into the upper portion of the pebble reaction chamber, the top of the solid heat exchange material forms a cone extending downwardly and outwardly from the solid material inlet in the top of the chamber. It will thus be seen that the gravitating pebble bed is of lesser thickness at its periphery than at its axis because of the fact that the top and bottom of the gravitating bed are in the shapes of cones.

Reactant materials which are introduced into the reaction chamber are raised to conversion temperature by direct heat exchange with the hot solid heat exchange material in the reaction chamber and resulting reaction products are removed from the upper portion of the reaction chamber. It has heretofore been thought that the gaseous material which flows upwardly through the gravitating bed of solid heat exchange material within the reaction chamber tends to follow the path of least resistance. That path of least resistance is along the periphery of the gravitating solid material bed inasmuch as the bed is thinner at its periphery than at its axis. A large portion of the nonuniform gas flow through a reaction chamber, however, is due to the fact that gases tend to flow toward cool areas and the peripheral portion of the reaction chamber is the coolest area of the gravitating solid material bed within the reaction chamber. The gases are caused to expand in the hot areas of the reaction chamber and contract in the cooler areas of that chamber. Thus, flow of gaseous material to the cooler areas results.

There are several reasons why the peripheral portion of the solid material bed is cooler than thte axial portion thereof. It has been known for some time that when a central solid material outlet is used, solid materials flowing through the central portion of the reaction chamber gravitate more rapidly than do the solid materials in the peripheral portion of the bed. Thus, the solid materials flowing through the central portion of the bed normally have less contact time with the gaseous materials in the reaction chamber and give up less of their heat to those materials than do solid materials flowing through the peripheral portion of the solid heat exchange material bed. The solid materials flowing through the peripheral portion of the bed are caused to contact gaseous material for a longer period of time by reason of its lower flow rate, thus giving up greater amounts of heat to the reactant and product materials. As the peripheral portion of the solid material contact bed gives up greater amounts of heat, that portion of the bed is cooled, thus attracting greater amounts of gaseous materials by reason of contraction of those gases which in turn gain additional heat from the solid heat exchange material, lowering the temperature of that solid material still further.

Still another reason for nonuniform solid material temperature is found in the fact that as solid materials are introduced into the top of the reaction chamber they are caused to contact some gaseous materials while at the peak of the cone of solid material formed at the top of the solid material bed. As the solid material rolls downwardly and outwardly over the top of the solid material bed, the solid material contacts even more of the gaseous materials, giving up heat thereto. Thus, as the solid material finally reaches the periphery of the solid material bed it has given up much more heat to gaseous material than has solid material which remains as an axial portion of the solid material bed. The temperature differential of pebbles across the top of the pebble bed between the axial and peripheral portion thereof generally varies within the range of 100° F. and 250° F. depending upon the gas flow rate and pebble flow rate.

Gas velocity also varies greatly at the top of the pebble bed. That variation is partly the result of the distance which the gas is caused to travel through any vertical section of the pebble bed. The peripheral portion of the pebble bed, being of less depth than the axial portion of the bed, has less effect in reducing the gas velocity than does the axial bed portion. With a conical-topped bed and a substantially horizontal gas inlet in the bottom of the chamber gas velocity between the peripheral and axial portions of the chamber at the top of the pebble bed varies between 50 and 100 inches per second at normal rates of flow. This difference is materially reduced in a substantially flat-topped bed.

Solid heat exchange material which is conventionally used in pebble heater apparatus is generally called "pebbles." The term "pebbles" as used herein denotes any solid refractory material of flowable size and form having strength, which is suitable to carry large amounts of heat from the pebble heating chamber to the gas heating chamber without rapid deterioration or substantial breaking. Pebbles conventionally used in pebble heater apparatus are substantially spherical in shape and range from about 1/8 inch to about 1 inch in diameter. In a high temperature process, pebbles having a diameter of between about 1/4 to 3/8 inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, stellite, zirconia, and mullite may be satisfactorily used to form such pebbles or may be used in admixture with each other or with other materials. Pebbles formed of such materials, when properly fired, serve very well in high temperatures, some withstanding temperatures up to about 3500° F. Pebbles which are used may be either inert or catalytic as used in any selected process.

An object of this invention is to provide improved pebble heat exchange apparatus. Another object of the invention is to provide improved means for obtaining more uniform contact of gaseous material and pebbles in pebble heater apparatus. Another object of the invention is to provide improved means for obtaining more uniform reaction of hydrocarbons in pebble heater apparatus. Another object of the invention is to provide means whereby overcracking of a portion of the hydrocarbon feed and undercracking of another portion of the hydrocarbon feed to the pebble heater apparatus is substantially overcome. Another object of the invention is to provide improved means for controlling flow of gaseous material to selected portions of a gravitating pebble bed. Another object of the invention is to provide improved means for controlling flow of selected portions of a pebble mass through a pebble heat exchange chamber. Other and further objects and advantages will be apparent to those skilled in the art upon study of the accompanying discussion and the drawings.

Broadly speaking, this invention comprises a means and method for controlling the gravitation of pebbles within a pebble heat exchange chamber so as to obtain heat exchange between a gaseous material and gravitating pebbles in any horizontal cross section of the pebble mass which will facilitate the optimum contact conditions in any one portion of that cross section. This control of heat exchange between gaseous materials and pebbles is also facilitated by control of flow of gaseous effluent from the upper portion of the pebble heat exchange chamber. The flow of feed into the heat exchange chamber, the removal of gaseous effluent from the upper portion of the heat exchange chamber and gravitation of pebbles into and out of the pebble heat exchange chamber are controlled in response to an operational differential obtained by measuring a gas variable portion of the chamber in the axial, intermediate and peripheral sections thereof. This differential may be one of temperature, specific gravity, composition, or flow rate at preselected points within the pebble heat exchange chamber. Any departure from a predetermined "normal" condition at any selected level in the heat exchange chamber will indicate nonuniform contacting and will result in an actuation of control members to regulate pebble flow or gas flow in response thereto.

A better understanding of the invention will be obtained upon reference to the diagrammatic drawings in which Figure 1 is an elevational schematic representation in section of a preferred form of the pebble heat exchange chamber of this invention. Figure 2 is a horizontal cross section taken on the line 2—2 of Figure 1. Figure 3 is an elevational representation in section of a modified form of the pebble heat exchange chamber of this invention. Figure 4 is another modification shown in elevational section of the pebble heat exchange chamber of this invention. Figure 5 is a diagrammatic elevation of a pebble heater apparatus utilizing the pebble heat exchange chambers of this invention.

Referring particularly to the device shown in Figure 1 of the drawings, heat exchange chamber 11 comprises an upright elongated shell 12 closed at its upper and lower ends by closure members 13 and 14, respectively. Pebble inlet conduit 15 is provided in closure member 13, preferably being axially poisitioned therein. Gaseous effluent conduit 16 extends from the upper end portion of chamber 11, preferably from closure member 13. Pebble outlet conduits 17 and 18 extend from the lower portion of chamber 11 at points in the peripheral portion and the axial portion of that chamber, respectively. Pebble conduits 17 and 18 terminate in a common pebble conduit 19. Gas variable sensing members 21 and 22 are provided in the upper portion of the chamber formed within shell 12. Sensing members 21 are positioned intermediate the axial and peripheral portions of the chamber formed within shell 12 and preferably immediately above the top of the gravitating mass of pebbles within that chamber. Sensing members 22 are positioned in the peripheral portion of the chamber formed within shell 12 and are preferably provided immediately above the gravitating mass of pebbles within that chamber. Sensing members 21 and 22 are preferably arranged tin pairs and on radii directly above or below the gas inlets, pebble inlets, gaseous effluent outlets, or pebble outlets controlled in response to measurement obtained thereby. Differential controllers 23 are operatively connected to sensing members 21 and 22 by conventional means depending upon the type of sensing means which is utilized. Gate-type motor valves 24 are provided in pebble conduits 18. Valves 24 are operatively connected to transducers or differential controllers 23, each of which is in turn operatively connected to a pair of corresponding sensing members 21 and 22 in the vertical section of the chamber above the corresponding valve 24. Gaseous material inlet conduit 25 is connected through shell 12 to gaseous material distributor member 26 in the lower portion of the chamber formed in shell 12. Distributor member 26 is an annular header member which is so constructed as to introduce a feed stream into the peripheral and lower portion of the chamber. Gaseous material inlets 35 and 36 are disposed about an annulus intermediate the axial and peripheral portions of the chamber. Gaseous material inlet conduits to inlets 35 and 36 extend through shell 12 and are provided with flow control valves 39 and 42 which are connected to differential controllers 23. Although only two inlets 35 and 36 are shown, others are used in the intermediate annulus in a like manner and are positioned below each pair of sensing members 21 and 22. Distributor member 26 is supported by support member 27 which may be utilized as gaseous material inlet conduits to distributor 26. Inlets 35 and 36 may be supported on header 26. When support members 27 are constructed as inlet conduits, conduit 25 will normally be connected to a header member encircling at least a portion of shell 12 and which header member will in turn be connected to the outer ends of support members 27.

As pointed out above, gas variable sensing members 21 and 22 may be conventional gas variable measuring means such as temperature sensing members such as thermocouples, thermisters, etc., gravitometers, or gas velocity or rate-of-flow sensing members such as hot wire anemometers. In one specific form, this invention may utilize the subject device disclosed and claimed in the application Serial No. 202,617, filed by W. C. Pouppirt, Jr., on December 26, 1950, now U. S. Patent No. 2,721,578. In that specific modification, samples of gaseous material are selectively directed to an analyzer, not shown, which analyzer is connected to differential controllers 23. In this manner, gate valves 24 are actuated in response to a deviation from normal conversion of gaseous materials in the axial portion of the chamber formed within shell 12.

Many devices have been investigated in attempts to obtain more uniform flow of pebbles through pebble heat exchange chambers. As has been pointed out above, the flow of pebbles in the peripheral portion of the heat exchange chamber is normally at a lower rate than the flow of pebbles through the axial portion of that chamber. For that reason, control valves are not required in the pebble conduits extending from the peripheral portion of the pebble chamber. By positioning the valves in the pebble outlet conduits from the axial portion of the pebble chamber, it is possible to control the flow of pebbles through the axial portion of the pebble chamber in relation to the flow of pebbles through the peripheral portion of that chamber so as to obtain a substantially uniform conversion of gaseous materials across the entire pebble bed.

In the device shown in Figure 3 of the drawings, similar parts are designated by the same numerals utilized in the description of the device shown in Figure 1. The device of Figure 3 is provided with a central pebble outlet conduit 31, in closure member 14, and with a plurality of gaseous effluent conduits 32, in closure member 13. Conduits 32 are provided with flow control valves 33, which are preferably of an automatic type. Gaseous material inlets 34, 35, 36, 37 and 38, are schematically shown as individual inlets provided in the axial, intermediate, and peripheral bottom section of the chamber formed within heat exchange chamber 11. In one modification, inlets 37 and 38 may be in the form of a single inlet header as shown by member 26 of Figure 1.

In the structure shown as Figure 3, sensing members 22 are provided in the peripheral portion of the chamber immediately above the normal level of the pebble bed 28 therein. Sensing members 21 are provided intermediate the axial and peripheral portions of the chamber, preferably directly above inlet members 35 and 36 and immediately above the normal level of the gravitating pebble bed 28. Sensing member 40 is provided adjacent the lower lip of the pebble inlet conduit 15 substantially above inlet means 34. Sensing members 21 and 22 are connected to differential controllers 23. One differential controller, hereafter designated as 23', is modified so as to establish two temperature differentials therein. This controller may in fact be two separate controllers. Sensing member 40 is operatively connected to differential controller 23'. The latter control is operatively connected to valve 39 in the inlet conduit connected to inlet means 36. Valve 39 is operated in response to a differential resulting from measurements obtained by sensing members 21 and 22. Controller 23' is also operatively connected to valve 41, which is provided in the inlet conduit connected to inlet means 34. Valve 41 is actuated in response to a differential resulting from measurements obtained by sensing members 21 and 40. The combination may be modified so as to establish the differential between measurements obtained in sensing members 22 and 40. Other differential controllers 23, are connected to valves 42 provided in the conduit connected to inlet means 35. As will be obvious, it is ordinarily desirable to utilize several inlets such as 35 and 36, equispaced and disposed within an annulus in the lower portion of the gravitating solid material bed intermediate the axial and peripheral portion thereof. When such an arrangement is provided, additional differential controllers 23 and sensing members 21 and 22 are provided so as to obtain sensings in appropriate sections spaced around the upper portion of the heat exchange chamber. These additional controllers 23 are operatively connected to valves in the inlet conduits connected to the additional inlet means in vertical chamber sections below the appropriate sensing members. Differential controllers 23 and 23' are additionally connected to valves 33 in gaseous effluent conduits 32 so as to control the flow of gaseous effluent through those conduits in response to a temperature or other differential between sensing members 21 and 22. Switch members 43 are provided in the connecting members extending between differential controls 23 and 23' and valves 33. These switch members make it possible to disconnect valves 33 from differential controllers 23 and 23' when desired.

Valves 44 are provided in the inlet conduits connected to inlet means 37 and 38 so as to provide means for manually setting the rate of flow through those conduits.

Members of the device shown in Figure 4 of the drawings have also been designated by numerals which are the same as those used in the description in connection with Figures 1 and 3 of the drawings. In this structure, pebble inlet conduits 45 are provided in closure member 13 spaced about and adjacent the periphery of heat exchange chamber 11. Pebble inlet conduits 46 are provided and spaced about an annulus in closure member 13 intermediate the axial and peripheral sections of heat exchange chamber 11. Pebble inlet conduit 15 is centrally provided in closure member 13 as described in connection with Figures 1 and 3. Valves 47 are provided in inlet conduits 46 and are operatively connected to transducers or differential controllers 48. Switch members 43 are provided in the connecting arrangement extending between differential controllers 48 and valves 47 so as to make it possible to disconnect valves 47 from the controlling effect of differential controllers 48. Sensing members 40, 21, and 22 are provided in this chamber and are arranged as described in connection with Figure 3. The sensing members in the structure shown in this figure of the drawings are disposed within the mass of gravitating pebbles though they may be positioned immediately above the pebble mass. Although schematically shown as extending from the walls of the chamber for the sake of simplicity of the drawing, it is obvious that these sensing members may be better maintained in place by extending them downwardly or upwardly through the pebble mass in probes and anchoring those probes so as to prevent lateral displacement. Sensing members 21 and 40 are connected to differential controller 49 which latter differential controller is connected to valve 51 in pebble inlet conduit 15 and to valve 41. Sensing members 21 and 22 are connected to differential controllers 48 which controllers are connected to valves 47 in intermediate conduits 46. Although valves 47 and 51 are diagrammatically shown as gate-type valves, it should be noted that other types of valves such as star valves, rotary table feeders, vibrating feeders, or the like, may also be utilized. Differential controllers 48 are connected to valves 39 and 42 as described in connection with Figure 2 of the drawings and differential controller 49 is connected to valve 41.

In the operation of the devices described as Figures 1, 3, 4 and 5 of the drawings, pebbles are introduced into the upper portion of heat exchange chamber 52 through pebble inlet conduit 53. Heating material such as hot combustion gases, or a gaseous fuel capable of being burned within chamber 52, is introduced into the lower portion of that chamber through inlet conduit 54. The hot gases are passed upwardly through the gravitating mass of pebbles within chamber 52 and heat those pebbles to a high temperature necessary for the desired reaction within heat exchange chamber 11. Gaseous effluent is removed from the upper portion of chamber 52 through gaseous effluent conduit 55 in the upper portion thereof. Generally pebbles within pebble heater chamber 52 are raised to a temperature within range of between 1200° F. and 3200° F., depending upon the reaction products desired from the conversion within reaction chamber 11 and the reactant materials to be converted therein. Temperatures within the range of between 1000° F. and 1800° F. are normally used for the conversion of hydrocarbon oils to form normally liquid olefins and aromatic hydrocarbon fractions, such as gasoline and the like. Temperatures within the range of between 1600° F. and 3200° F. are normally utilized for converting normally gaseous materials such as ethane to ethylene, acetylene, or the like. The temperature to which pebbles are heated within pebble heater chamber 52 is normally about 100° F. to 200° F. above the highest reaction temperature desired in reaction chamber 11. The pebbles which are heated to a high temperature within chamber 52, are gravitated from that chamber through conduit 15 or through the plurality of conduits 15, 46 and 45, described in connection with Figure 4 and into the upper portion of heat exchange chamber 11. Gaseous reactant materials are introduced into the lower portion of heat exchange chamber 11 through inlet conduit 25 and the plurality of conduits connected to inlet means 34, 35, 36, 37 and 38 as described in connection with Figures 3 and 4. The gaseous reactant materials are caused to flow countercurrent to the gravitating mass of pebbles within chamber 11 and resulting reaction products are removed from the upper portion of that chamber through gaseous effluent conduit 16.

Differential controllers 23 receive the temperature, specific gravity, or rate-of-flow measurements from sensing members 21, 22, and 40 and convert the signals received from those sensing members to power, whereby valves 24, 39 and 42 (Figure 1) are caused to open or close depending upon what gas variable is being measured. When temperature measurements are sought and the differential between the measurements obtained from sensing members 21 and 22 approaches a predetermined differential, valve members 24 are actuated so as to proportionately open more completely and valve members 39 and 42 are proportionately closed. As the differential deviates progressively from the predetermined differential, the measurement obtained through sensing member 21 being the greater, valve members 24 are caused to be proportionately closed and valve members 39 and 42 are proportionately opened. In this manner, the flow of pebbles through the central or axial portion of heat exchange chamber 11 is retarded so as to more nearly approach the flow of pebbles through the peripheral section of the chamber and the volume of gas passed through the axial bed section is varied so as to approach the flow through the peripheral section thereof. The pebbles which are withdrawn from the lower portion of heat exchange chamber 11 are passed by means of conduit 56 to the lower portion of elevator 57. The pebbles are elevated by means of elevator 57 to the upper end portion of pebble conduit 53, through which conduit they are returned to the upper portion of heat exchange chamber 52. When sensing members 21 and 22 are gas velocity measuring members, valves 24, and 39 and 42 are operated to close and open, respectively, when the measurement of member 22 becomes increasingly more than that obtained by member 21 and departs from a predetermined differential. The valves are operated in an opposite manner as the measurements approach a predetermined differential, the measurement of 22 still being greater than that of 21.

As will be noted, the method described in connection with the operation of the device in Figure 1 of the drawings is modified somewhat for application to the device shown as Figure 3 of the drawings. In this device the measurements obtained by sensing members 21 and 40 or by 22 and 40 are transmitted to differential controller 23' and valve 41 is operated in response thereto so as to control the flow of gaseous material through inlet 34 as described above. In this operation, as the value of the temperature measurement obtained by the sensing member 40 exceeds the value of the temperature measurement obtained by sensing member 21, valve 41 is progressively opened so as to allow the flow of a greater volume of gaseous material into the lower portion of the gravitating pebble bed within chamber 11. Similar operation is applied when utilizing the temperature differential between sensing members 21 and 22. As the differential increases because of the higher measurement obtained by sensing members 21, differential controllers 23 and 23' apply power in response to those measurements so as to cause valves 39 and 42 to be progressively opened and so as to supply a greater volume of gaseous reactant material to the lower intermediate annular section of the gravitating pebble mass within chamber 11. When desired, switch members 43 may be closed so as to complete the circuit between valve member 33 and differential controllers 23 and 23'. As the differential becomes greater, valve members 33 are progressively closed. Such operation permits the balancing of flow of gaseous effluent from the upper portion of the heat exchange chamber so as to allow more uniform reaction within that chamber.

The operation of the device shown as Figure 4 is similar to that described in connection with the apparatus shown as Figure 3. In this structure, the differential controllers are connected to valves 51 and 47 as well as valves 39, 41 and 42. Thus, as flow of gaseous feed into the axial and intermediate portions of the chamber is increased, the flow of pebbles thereto is decreased and vice versa. In this manner, the flow of pebbles into the selected portions of the pebble chamber is controlled so as to balance the heat exchange between gaseous reactant materials and pebbles in any horizontal cross-section taken within chamber 11. The plurality of pebble inlet conduits makes possible the provision of a pebble bed which is substantially flat on its upper surface. The feed inlets are disposed so as to generally correspond in contour to the shape of the top of the pebble bed. This combination of pebble inlets can be utilized with any combination of features described in connection with the other devices of Figures 1 and 3. Any of the features of any of the specific devices can be utilized or interchanged with features of the other.

Many modifications of this invention will be apparent to those skilled in the art upon study of the accompanying disclosure. Such modifications, being clearly apparent from this disclosure are believed to be within the spirit and scope of this invention.

I claim:

1. An improved pebble heat exchange chamber comprising in combination a closed upright shell; at least one pebble inlet conduit extending downwardly into the closed upper end of said shell and one said inlet conduit extending into the axial portion of said shell; at least one gaseous effluent conduit extending from the closed upper end of said shell; at least one pebble outlet conduit extending downwardly from the closed lower end of said shell and one said pebble outlet conduit extending downwardly from the axial portion of said shell; a first plurality of gas variable sensing members disposed in the upper portion of said shell and disposed about the peripheral portion of the chamber formed within said shell; a second plurality of similar gas variable sensing members disposed in the upper portion of said shell and disposed intermediae the axial and peripheral portions of the chamber formed within said shell, each said second sensing member being paired with a said first sensing member and one member of each pair being at a different level than the other member of that pair; differential controller means connected to each pair of said first and second gas variable sensing members; at least one first constant feed inlet means disposed in and around the lower and peripheral portion of said shell; a first feed inlet conduit extending into said shell and connected to said first feed inlet means; a plurality of second feed inlets disposed in and around the lower portion of said shell and intermediate said first feed inlet means and the axial portion of said shell, one of said second feed inlets being disposed below each pair of sensing members; second feed inlet conduits extending into said shell and connected to individual said second feed inlets; and a flow control valve in each said second feed inlet conduit and operatively connected to the differential controller which is connected to a pair of sensing members in a vertical section above the second feed inlet means and which feed inlet is connected to respective said flow control valves.

2. The pebble heat exchange chamber of claim 1, wherein said first and second gas variable sensing members are temperature-measuring means.

3. The pebble heat exchange chamber of claim 1, wherein said first and second gas variable sensing members are gas velocity-measuring means.

4. The pebble heat exchange chamber of claim 1, wherein a third gas variable sensing member is provided in the axial and upper portion of the chamber formed within said shell; and said first, second and third gas variable sensing members are disposed in the upper portion of said chamber above the normal level of pebbles within that chamber; third feed inlet disposed in the lower axial portion of said chamber; a third feed inlet conduit extending into said shell and connected to said third feed inlet; a flow control valve in the said third feed inlet conduit; a differential controller operatively connected to said third gas variable sensing member and one of said second gas variable sensing members and to said flow control valve in said third said inlet conduit.

5. The pebble heat exchange chamber of claim 4, wherein a plurality of gaseous effluent conduits are provided in the upper portion of said shell; a flow control valve in each said gaseous effluent conduit, each said flow control valve being operatively connected to the differential controller means which is in turn connected to first and second gas variable sensing members in the vertical section below the gaseous effluent conduit in which the respective flow control valve is disposed.

6. A pebble heat exchange chamber of claim 1, wherein a third gas variable sensing member is provided in the axial and upper portion of said chamber, said first, second and third gas variable sensing members being disposed below the normal upper level of pebbles within said chamber; a third feed inlet axially disposed in the lower portion of said chamber; a third feed inlet conduit extending into said shell and connected to said third feed inlet; a flow control valve in said third feed inlet conduit; a plurality of pebble inlet conduits extending into the upper portion of said shell and disposed about the periphery of said chamber; a plurality of pebble inlet conduits extending into the upper portion of said shell and disposed about an annulus intermediate said axially positioned pebble inlet conduit and said peripherally positioned pebble inlet conduits; a pebble flow control valve in said axially positioned pebble inlet conduit; a differential controller connected to said third gas variable sensing member and one of said second gas variable sensing members, said differential controller being operatively connected to said flow control valve in said third feed inlet conduit and to said flow control valve in said axially positioned pebble inlet conduit.

7. A pebble heat exchange chamber of claim 1, wherein a third gas variable sensing member is provided in the axial and upper portion of said chamber, said first, second and third gas variable sensing members being disposed below the normal upper level of pebbles within said chamber; a third feed inlet axially disposed in the lower portion of said chamber; a third feed inlet conduit extending into said shell and connected to said third feed inlet; a flow control valve in said third feed inlet conduit; a plurality of pebble inlet conduits extending into the upper portion of said shell and disposed about the periphery of said chamber; a plurality of pebble inlet conduits extending into the upper portion of said shell and disposed about an annulus intermediate said axially positioned pebble inlet conduit and said peripherally positioned pebble inlet conduits; flow control valves in each said intermediately positioned pebble inlet conduit, said flow control valves being operatively connected to said differential controller means which are connected to first and second gas variable sensing members in a vertical section below a respective said intermediately positioned pebble inlet conduit; a pebble flow control valve in said axially positioned pebble inlet conduit; a differential controller connected to said third gas variable sensing member and one of said second gas variable sensing members, said differential controller being operatively connected to said flow control valve in said third feed inlet conduit and to said flow control valve in said axially positioned pebble inlet conduit.

8. The pebble heat exchange chamber of claim 1, wherein said first and second gas variable sensing members are gravitometers.

9. An improved pebble heat exchange chamber comprising in combination a closed upright shell; at least one pebble inlet conduit extending downwardly into the closed upper end of said shell and one said inlet conduit extending into the axial portion of said shell; at least one gaseous effluent conduit extending from the closed upper end of said shell; a first plurality of gas variable sensing members disposed in the upper portion of said shell and disposed about the peripheral portion of the chamber formed within said shell; a second plurality of similar gas variable sensing members disposed in the upper portion of said shell and disposed intermediate the axial and peripheral portions of the chamber formed within said shell, each said second sensing member being paired with said first sensing member, said first and second gas variable sensing members being positioned immediately above the normal level of a pebble bed within said chamber; differential controller means connected to each pair of said first and second gas variable sensing members; a plurality of pebble outlet conduits extending downwardly from the bottom and peripheral portion of said pebble heat exchange chamber; a plurality of pebble outlet conduits extending downwardly from the bottom and axial portion of said pebble heat exchange chamber; a pebble flow control valve in each said axial pebble outlet, each said flow control valve being connected to the differential controller which is connected to the pair of sensing members in a vertical section above the respective pebble outlet conduit; at least one first feed inlet means disposed in and around the lower and peripheral portion of said shell; a first feed inlet conduit extending into said shell and connected to said first feed inlet means; a plurality of second feed inlets disposed in and around the lower portion of said shell and intermediate said first feed inlet means and the axial portion of said shell, one of said second feed inlets being disposed below each pair of sensing members; second feed inlet conduits extending into said shell and connected to individual said second feed inlets; and a flow control valve in each said second feed inlet conduit and operatively connected to the differential controller which is connected to a pair of sensing members in a vertical section above the second feed inlet means and which feed inlet is connected to respective said flow control valves.

10. In a pebble heater apparatus for reacting hydrocarbons wherein a mass of pebbles is heated in a pebble heating chamber to a temperature within the range of between 1200° F. and 3400° F.; said heated mass of pebbles is gravitated from the bottom of said pebble heating chamber into the upper portion of a reaction chamber, and downwardly through said reaction chamber as a contiguous pebble mass; first constant feed inlet means disposed in and around the lower and peripheral portion of said reaction chamber for introducing a first portion of a hydrocarbon reactant material as a gaseous feed into the lower and peripheral portion of said reaction chamber at a predetermined rate of flow; second inlet means disposed in and around the lower and intermediate portion of said reaction chamber for introducing a second portion of the same hydrocarbon reactant material as a gaseous feed into the lower portion of said reaction chamber at a plurality of points intermediate said peripheral portion and the axial portion of said reaction chamber and at a variable rate of flow; first measuring means disposed in a vertical section above said first inlet means and in the upper peripheral portion of said reaction chamber for measuring a gas variable therein; second measuring means disposed in a vertical section above said second inlet means and in the upper intermediate portion of said reaction chamber intermediate said peripheral portion and the axial portion of said reaction chamber for measuring a like gas variable in said intermediate portion of said reaction chamber; means for determining the difference between gas variable measurements obtained in said upper peripheral and gas variable measurements obtained in said upper intermediate portions of said reaction chamber; means for varying the rate of introduction of said second portion of said reactant material in response to said difference so as to cause said gas variable measurements to become more nearly equal; means comprising at least one outlet conduit for removing resulting gaseous effluent reaction products from the upper portion of said reaction chamber; means for gravitating pebbles from the lower portion of said reaction chamber; and means for elevating said last named pebbles to the upper portion of said pebble heating chamber.

11. The apparatus of claim 10 wherein said means for measuring a gas variable comprises temperature measuring means, and means for increasing the rate of introduction of said second portion of hydrocarbon reactant material as the temperature of gas in said upper intermediate portion of said reaction chamber becomes increasingly greater than the temperature of gas in said upper peripheral portion of said reaction chamber.

12. In the apparatus of claim 11, third inlet means disposed in the axial and lower portion of said reaction chamber for introducing a third portion of said hydrocarbon reactant material as a gaseous feed into the lower and axial portion of said reaction chamber, third measuring means disposed in a vertical section above said third inlet means and in the upper axial portion of said reaction chamber for measuring a like gas variable therein, and means for increasing the rate of introduction of said third portion of gas as the temperature of gas in the upper axial portion of the reaction chamber becomes increasingly greater than the temperature of gas in the upper intermediate portion of the reaction chamber.

13. In the apparatus of claim 12, means for retarding the removal of reaction products as the difference between the temperature of gas in the upper intermediate portion of the reaction chamber and the temperature of gas in the upper peripheral portion of the reaction chamber becomes increasingly great.

14. In the apparatus of claim 11, means for decreasing the pebble flow rate through the axial portion of the reaction chamber as the rate of introduction of said second portion of hydrocarbon reactant material is increased.

References Cited in the file of this patent

UNITED STATES PATENTS

| | | |
|---|---|---|
| 1,143,380 | Gibson | June 15, 1915 |
| 2,073,650 | Prickett | Mar. 16, 1937 |
| 2,154,795 | Westenberg | Apr. 18, 1939 |
| 2,432,872 | Ferro | Dec. 16, 1947 |
| 2,432,873 | Ferro et al. | Dec. 16, 1947 |
| 2,438,728 | Tyson | Mar. 30, 1948 |
| 2,448,257 | Evans | Aug. 31, 1948 |
| 2,554,407 | Hepp | May 22, 1951 |
| 2,554,435 | Weber | May 22, 1951 |
| 2,559,957 | Hepp et al. | July 10, 1951 |
| 2,565,811 | Hall | Aug. 28, 1951 |
| 2,577,655 | Grossman et al. | Dec. 4, 1951 |